March 14, 1967

D. J. TOMAN ET AL 3,309,708

TACTICAL LANDING APPROACH RADIO SYSTEM

Filed March 11, 1966

INVENTOR.
DONALD J. TOMAN
LEONARD O. VLADIMIR
BY
*H. S. Mackey*
ATTORNEY

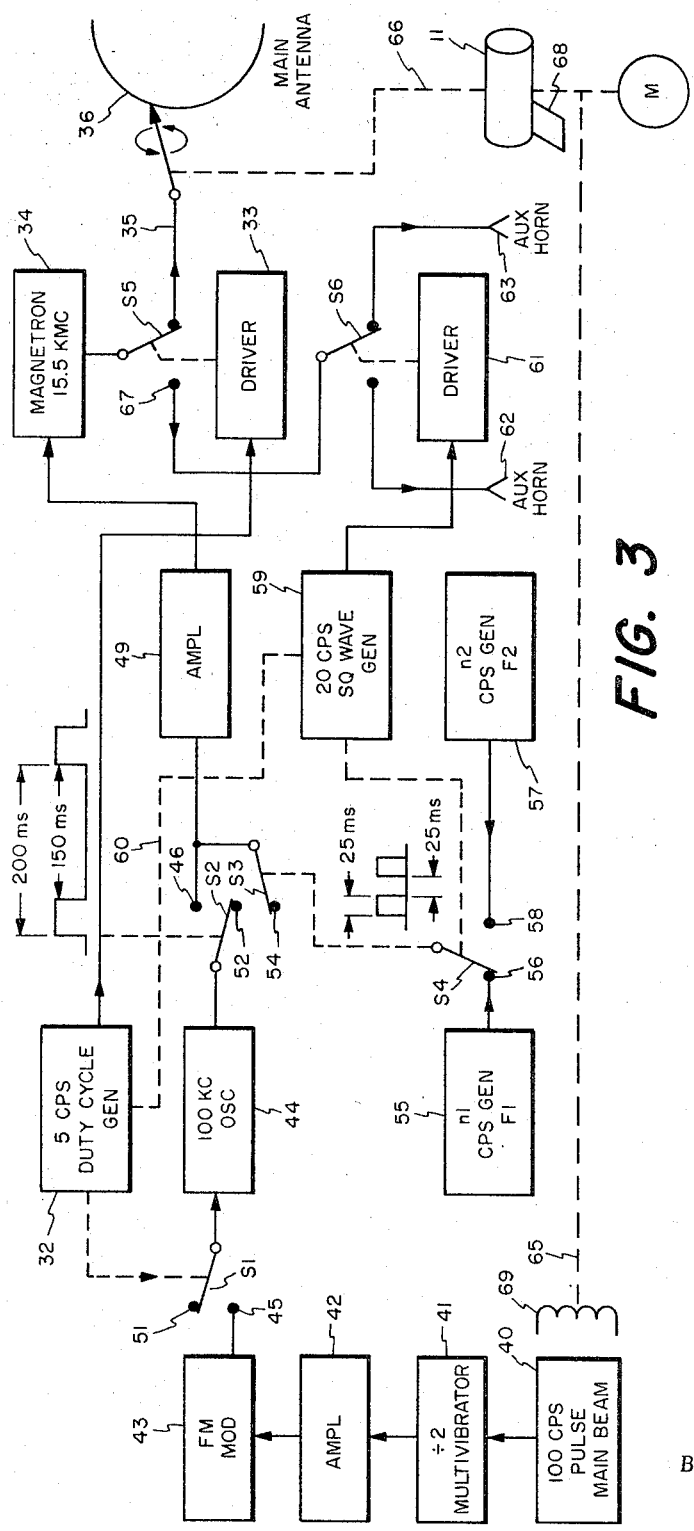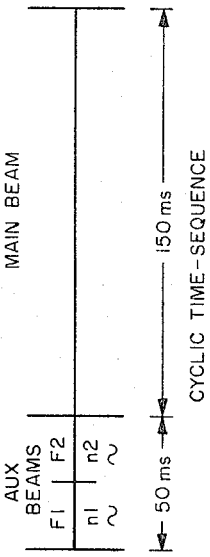

INVENTOR.
DONALD J. TOMAN
LEONARD O. VLADIMIR
BY
ATTORNEY 3,309,708
TACTICAL LANDING APPROACH RADIO SYSTEM
Donald J. Toman, Pleasantville, and Leonard O. Vladimir, Chappaqua, N.Y., assignors to General Precision, Inc., a corporation of Delaware
Filed Mar. 11, 1966, Ser. No. 533,647
7 Claims. (Cl. 343—108)

The present invention relates to a tactical landing approach radio system for aircraft. In particular the present invention is an improvement on the landing system disclosed in United States Patent No. 3,197,777 issued to Michael W. McKay on July 27, 1965.

It has been found that while the landing system of the Patent 3,197,777 is practical and useful for aiding the landing of aircraft, the system falls short of perfection and it is believed that the present invention is a great improvement and advance toward a perfect, practical tactical landing approach radio system for aircraft.

The system described in the Patent 3,197,777 employs transmission of a very narrow beam. The area of the beam, which is about a mile wide and two to four thousand feet high at some ten miles from the point of transmission is a very small area for the pilot of an aircraft to locate. In addition it has been found that false courses are generated, caused by side lobes of radio energy from the transmitting antenna. In the present state of the art side lobes are not completely eliminated by antenna design.

The present invention overcomes both the false course problem and also provides a larger localizing area.

It has been observed that the side lobes producing false courses have objectionable effect on the sides of the main beam while the side lobes normally present above and below the main beam are of little significance. Any side lobe that may appear below the main beam is usually very weak since much of the RF energy is absorbed by the earth. The side lobe that may appear above the main beam develops a false course that may be readily identified by the pilot of an aircraft because of the steep glide path that following such course will produce.

It is therefore a principal object of the present invention to provide a tactical landing approach radio system which eliminates objectionable false courses.

Another object is to provide an improved tactical landing approach radio system which enlarges the localizing area.

These and other objects will become apparent from reading the following detailed specification with reference to the accompanying drawings in which:

FIG. 3 is a block diagram of a transmitter;

FIG. 4 is a cyclic time-sequence chart, and

Figure 1:
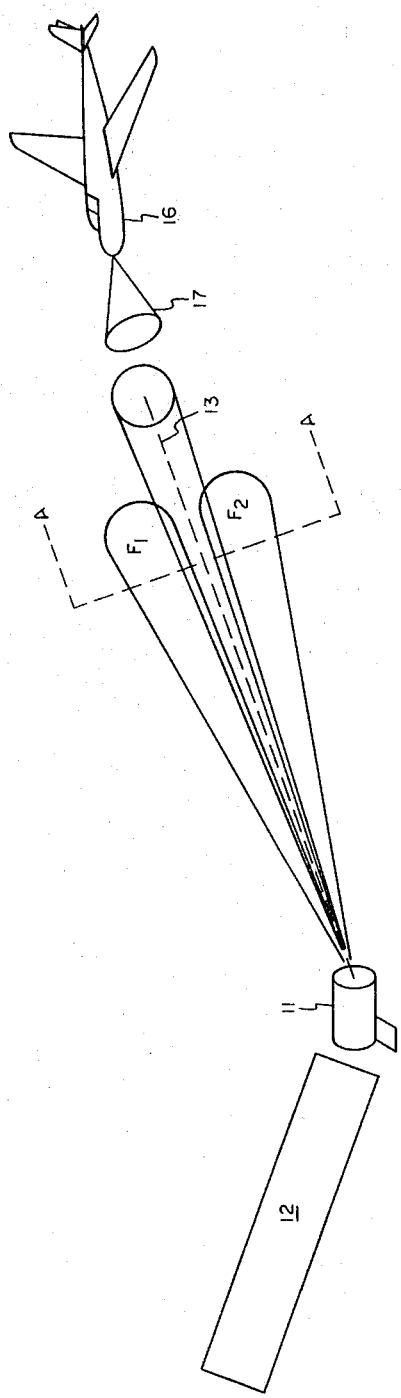
FIG. 1 is a diagrammatic representation of a landing strip, a transmitter, the transmitted beam and an aircraft with a receiver.

Referring now to FIG. 1, a transmitter 11 is represented as positioned at the end of a landing strip or runway 12. The transmitter, in its preferred form, includes a paraboloid reflector measuring some 18 inches in diameter. The transmitter-antenna combination is sufficiently compact and small that the combination may be positioned at the approach end of the landing strip and centrally located across the width of the strip.

The antenna projects a composite beam consisting of a main beam MB which may, for example, have a width of 3° between half power points and two auxiliary beams F1 and F2 positioned respectively at the sides of the main beam.

As represented in FIG. 3, the antenna, which may be of a parabolic type, projects a 3° main beam at a selected glide slope angle. At the same time the signal is conically scanned over a surface having, for example, a 6° apex angle. In FIG. 3 this is represented as a motor M which physically rotates a subreflector in the antenna, the rotation being represented by broken line 66. It will be appreciated that other arrangements may be used for rotating the transmitted main beam. The glide slope angle is represented by broken line 13 in FIG. 1. The receiver is located in the aircraft, such as 16 and includes a small horn antenna having a receptivity pattern, represented as 17, of for example 60° in angular extent.

As will be explained with reference to FIG. 5, the receiver is so instrumented that the information impressed on the components of the transmitted composite beam produces indications which inform the pilot of his position relative to the main beam so that he may steer so as to fly in exact coincidence with the axis 13, or boresight of the main beam.

Figure 2:
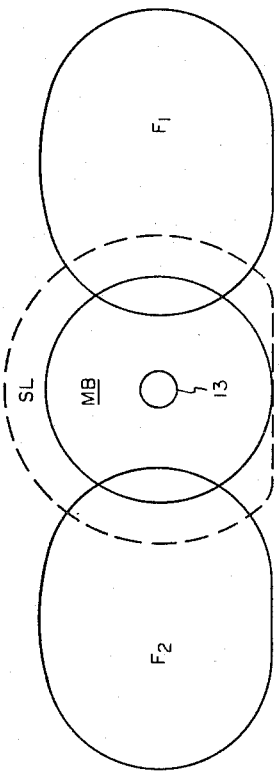
FIG. 2 is a representation of a cross-section of the projected beam along line A—A.

Referring to FIG. 2, it will be seen that the main beam MB is substantially surrounded by side lobes SL. Without the beams F1 and F2 a pilot could locate in the side lobe of the main beam either to the right or the left of the main beam. If this occurred the pilot would be flying on a false course. If he were positioned in the side lobe above the main beam, the slope of his glideangle would be too steep and he would know he was on a false course.

However, with the present composite beam, as seen in cross-section along lines A—A, the main beam MB is essentially bracketed by the auxiliary beams F1 and F2. The side lobes at the bottom of the main beam are substantially absorbed by the earth. The side lobes at the top of the main beam are present. Auxiliary beams F1 and F2 essentially overcome or blanket the side lobes at the sides of the main beam and in fact overlap some portion of the main beam.

Each auxiliary beam is characterized so as to be capable of positive identification so that a pilot flying in one of the auxiliary beams will receive indication of his location and/or the direction he must steer to enter the main beam so that he may boresight the main beam. In the present arrangement the individual beams are transmitted in programmed sequence so that many transmitter components are used in common.

Referring to FIG. 3, a block diagram of an instrumentation of a transmitter is presented. FIG. 4 illustrates a cyclic time-sequence chart, showing the preferred time distribution among the individual beams of the composite transmitted beam.

During a 200 millisecond (ms.) time cycle period, an interval of 50 ms. is allocated to transmission of the auxiliary beams and the remaining 150 ms. interval is allocated to transmission of the main beam. Out of the 50 ms. interval, 25 ms. is allocated for generation and transmission of auxiliary beam F1 and 25 ms. is allocated for generation and transmission of auxiliary beam F2.

The cyclic time-sequence is controlled by a 5 cycle per second (c.p.s.) duty cycle generator block 32 which provides a 50 ms. pulse with an interpulse interval of 150 ms., the total time cycle being 200 ms. (as shown to the right of block 32).

During the interpulse period (150 ms.) the switches S1 and S2 are positioned for completing instrumentation for generating an RF signal for the main beam and driver 33 positions switch S5 for coupling the output of the magnetron, block 34, to the waveguide 35 connected to the main antenna 36. The magnetron may generate a carrier signal at a frequency of 15.5 kmc., for example.

Impressed upon the carrier signal is a frequency modulated, 100K cycle signal. The frequency modulation is developed by the instrumentation including block 40, a 100 c.p.s. pulse generator, a divider circuit, block 41 which provides a 50 c.p.s. signal output, which is amplified by amplifier 42 and applied to a frequency modulation circuit 43.

It is preferred that the frequency modulation be synchronized with rotation of the transmitted beam. Thus the motor M may be used to rotate the beam at 6000 r.p.m. (100 r.p.s.) and to drive the 100 cycle per second pulse generator, as represented by broken line 65, so that a positive predetermined relationship in phase and position exists between the beam rotated at 100 r.p.s. and the 100 c.p.s. generated pulse. This may be accomplished, for example, by rotating a magnetic member, 68, past a pickup coil 69 generating a pulse therein on each revolution of the transmitted beam.

The output of the FM modulator, block 43, is applied to a 100K cycle oscillator block 44 via switch S1 which is in its closed position 45.

Thus, the 100K cycle signal is frequency modulated at 50 c.p.s.

The output of the 100K cycle signal is applied via switch S2 in position 46 to a 100 kc. amplifier 49. The output of amplifier 49 is applied to the magnetron 34. This effectively drives the magnetron for generating a carrier signal of 15.5 kmc. which is amplitude modulated by the frequency modulated 100K cycle signal. The output of the magnetron is applied to the waveguide 35 via switch S5 and thence to the main antenna 36, for directional transmission.

It should be understood that the instrumentation of the preferred embodiment provides an arrangement for driving the magnetron by the output of the 100K cycle signal from the amplifier 49. Thus, without a 100 kc. signal there is no output from the magnetron and, therefore, no transmitted beam.

When the duty cycle generator 32, provides its 50 ms. pulse output, switch S1 is opened (position 51) and switch S2 is positioned to position 52 and driver 33 is operated to position switch S5 at 67 thus coupling any output from the magnetron to switch S6 thereby terminating transmission of the main beam.

By opening switch S1, the output of the FM modulator, 43, is disconnected from the 100K cycle oscillator and the 100K cycle output signal is free from frequency modulation.

The positioning of switch S2 to position 52 for 50 ms. prepares for contact between switches S2 and S3 as switch S3 oscillates between positions 52 and 54, as controlled by either block 55 or 57 as determined by the position of switch S4.

The oscillation of switch S3 between positions 52 and 54 is controlled by block 55, $n1$ c.p.s. generator, when switch S4 is in position 56 and by block 57, $n2$ c.p.s. generator, when switch S4 is in position 58. The positioning of switch S4 is controlled by block 59, the 20 c.p.s. square wave generator.

It will be appreciated that the switch S4 may be effectively switched between positions 56 and 58 with the switching to occur extremely rapidly and the delay at each position being substantially 25 ms. Thus block 55 will be coupled to control switch S3 for substantially 25 ms. and block 57 will be coupled to control switch S3 for the next 25 ms., both occurring during the 50 ms. interval. Actually the switching of switch S4 is a continuing process however. The positioning of switch S2 to position 52 permits contact with switch S3 as the latter is oscillated between positions 52 and 54.

When block 55 is coupled (via switch S4 in position 56) for controlling switch S3, the switch S3 is effectively oscillated between positions 54 and 52 at a rate of $n1$ times a second. This is accomplished by the $n1$ c.p.s. generator which drives switch S3. This arrangement effectively provides a 100K cycle signal pulsed $n1$ c.p.s. for a 25 ms. interval. When, during the next 25 ms., switch S4 is positioned to 58 then a 100K cycle signal pulsed $n2$ c.p.s. for a 25 ms. interval is provided. It will be appreciated that although switches S1 through S4 are represented in mechanical form such switches may be electronic switches such as transistor switches, for example.

It will be appreciated that the representative values $n1$ and $n2$ may vary widely. Successful operation of a landing approach radio system has been achieved with $n1$ c.p.s. representing 900 cycles per second and $n2$ c.p.s. representing 540 cycles per second.

By synchronizing the 5 c.p.s. duty cycle generator and the 20 c.p.s. square wave generator, such as represented by broken line 60 the outputs of the generators will be such that the leading edge of the 50 ms. pulse from block 32 will be in coincidence with the leading edge of a square wave pulse output from block 59 thereby ensuring that two full consecutive 25 ms. intervals (a 25 ms. square wave with an interpulse interval of 25 ms. such as represented graphically to the left of block 59) will occur during the 50 ms. pulse.

The output of the 5 c.p.s. duty cycle generator is applied to the driver 33 and during the 50 ms. pulse, the driver 33 operates to position switch S5 to the position 67 thus applying any output of the magnetron to the switch S6 which will selectively couple the microwave energy to the auxiliary horn 62 or 63, according to the position of switch S6. Switch S6 is controlled by driver 61 which is in turn controlled by the output of the 20 c.p.s. square wave generator.

The switches S5 and S6 may be waveguide switches which may couple microwave energy to one waveguide section or another, according to the position of the switches respectively.

Thus there has been described, in representative instrumentation, one form of transmitter for providing a main beam and two auxiliary beams of a tactical landing approach radio system. Obviously other transmitters could be devised which may differ in beam identification. In principle, the side lobes of the main beam should essentially be blanketed with two or more auxiliary beams for eliminating the false courses developed by the side lobes and, for expanding the localizing area with auxiliary beams having particular identification characteristics for informing a pilot where he is to steer for entering the main beam.

Figure 5:
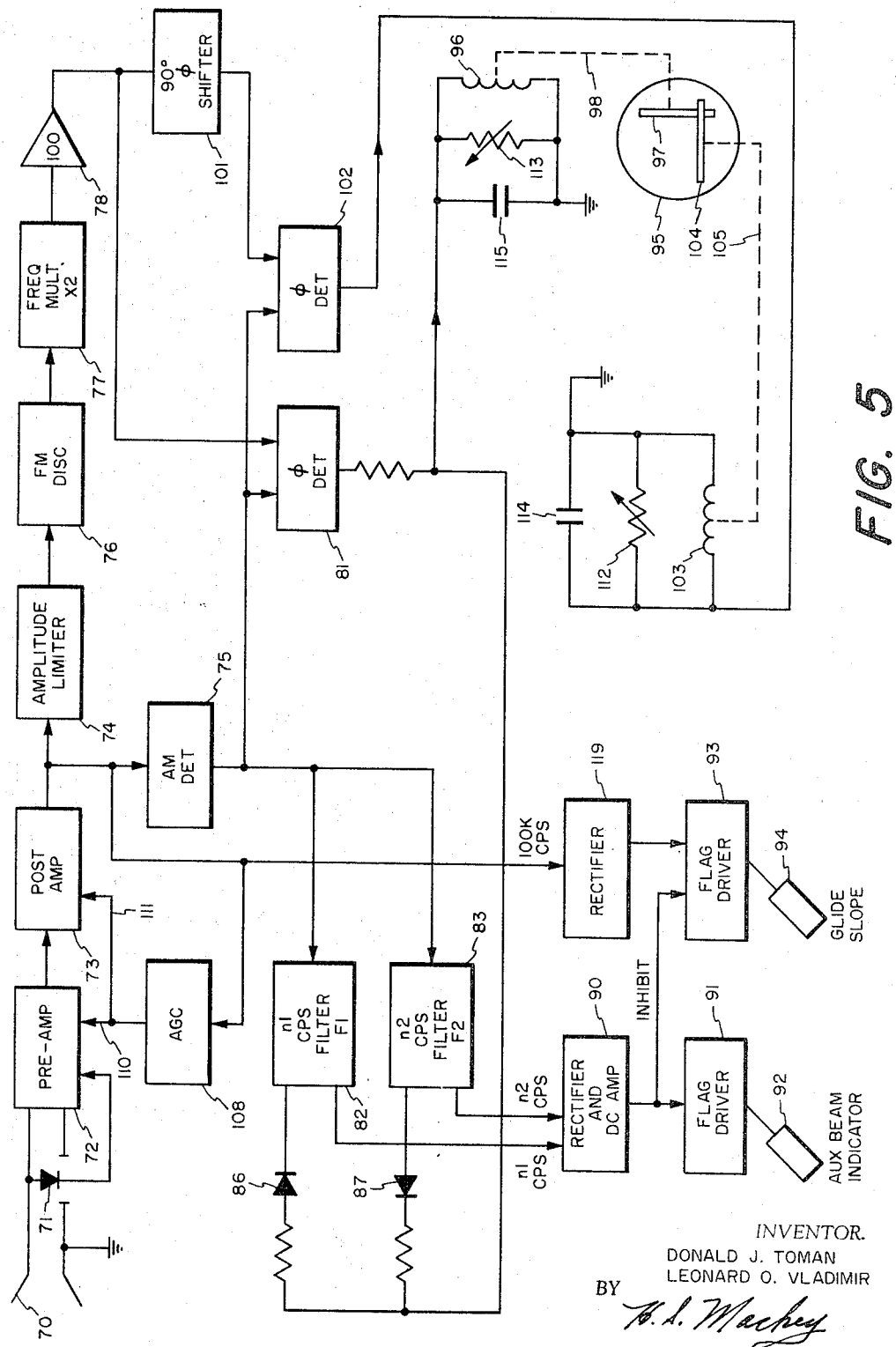
FIG. 5 is a block diagram of the receiver.

Referring to FIG. 5 the preferred form of receiver is represented partly in block and partly in schematic form. The receiver is carried by the approaching aircraft, the transmitted signals being received by a horn antenna 70. Since three separate beams, each having distinguishing characteristics, are transmitted an aircraft could be in any one of the beams. The receiver includes circuitry for distinguishing the auxiliary beams and for indicating the direction to the main beam. Once oriented a pilot may enter the main beam and steer to the axis and essentially boresight the main beam to the landing strip.

Let it first be considered that an aircraft localizes in the beam F1. This beam will be transmitted for 25 ms. out of each cycle of 200 ms. In addition, since switch S1 (FIG. 3) is open the signal will be free from the 50 cycle frequency modulation.

The receiving antenna 70 picks up beam F1, for example, which is a 100K cycle signal pulsed at a rate of $n1$ c.p.s. on a carrier of 15.5K megacycles. The 100K cycle signal is recovered by a crystal rectifier 71 and this signal is applied to the preamplifier 72 and post amplifier 73, for amplification.

The signal is applied to an amplitude limiter but since there is no 50 cycle frequency modulation, the frequency modulation discriminator 76 provides no output.

The output of the post amplifier 73 is applied to an amplitude modulation detector 75, the output of which corresponds to the amplitude modulation of the received signal. The amplitude modulation may be a 100 cycle modulation if the main beam is being received, an $n1$ cycle modulation if beam F1 is being received or an n2 cycle modulation if beam F2 is being received.

Assuming the beam F1 is being received, a 25 ms. signal having an amplitude modulation of n1 cycles per second is received out of each 200 ms.

The signal is applied to both the n1 cycle filter, block 82 and the n2 cycle filter, block 83. These filters are designed to detect the envelope of the pulsed signal. Thus the filter 82 detects and passes the n1 cycle envelope of the signal.

If the aircraft were in the beam F2, the output of the amplitude detector 75 would be a signal 25 ms. in duration, out of every 200 ms. having an amplitude modulation of n2 cycles per second. The envelope of this signal would be detected and passed by the n2 cycle filter 83.

Filter 82 will pass the n1 cycle component of signal F1 and apply it to diode 86 which passes the negative portion of the signal to the coil 96. Filter 83 will pass the n2 cycle component of signal F2 and apply it to diode 87 which passes the positive portion of the signal to the coil 96. As will be seen below the output of the phase detector 81 may be positive or negative, and this signal is also applied to the coil 96. The character of the signal applied across the coil 96 will drive the bale 97 and thus indicate to the pilot that he is receiving the beam signal and which direction he must stear to approach the center of the scan of the main beam.

The output of the n1 cycle filter 82 and the output of the n2 cycle filter 83, when occurring, is also applied to an auxiliary beam indicator network. This may include a rectifier and amplifier such as represented by 90 which receives the n1 cycle pulsed signal and rectifies such signal into a direct current (D.C.) signal. The D.C. signal may be applied to a flag driver circuit, such as 91, which may cause the flag driver to deflect, for example hide, the auxiliary beam indicator flag 92, thereby indicating the signal received is an auxiliary beam signal. At the same time the output of the rectifier and amplifier 90 is applied to the glide slope flag driver circuit 93, as an inhibit to prevent excitation of the glide slope flag 94.

The auxiliary beam indicator network may also include circuitry for deriving a D.C. from application of the n2 cycle pulsed signal which D.C. may also excite the flag driver 91 to deflect the auxiliary beam indicator flag again indicating the signal received is an auxiliary beam signal. By considering the direction of deflection of the bale 97 and deflection of the auxiliary beam indicator flag a determination may be made as to which auxiliary beam is being received. In addition, the output of the rectifier-amplifier 90 is applied to inhibit excitation of the glide slope flag circuit 93.

Thus a pilot will know from the system indicators that he is localized in the beam and which beam he is flying in. He will therefore know where to steer to position his craft in the main beam.

Consider now that an aircraft is positioned in the main beam and that the antenna 70 is receiving the transmitted main beam. This is a 100 kc. signal frequency modulated at 50 c.p.s. on a 1.5 k.m.c. carrier. As received by an aircraft approaching the transmitter the signal may also be amplitude modulated at a frequency of 100 c.p.s.

The amplitude modulation of the main beam arises from the fact that the transmitted beam is rotated about the axis 13, for example (FIGS. 1 and 2). The rotation occurs at a rate of 100 cycles per second. When the aircraft is not boresighting the main beam (not in coincidence with the axis 13) the rotating directional beam sweeps past the aircraft on each revolution. Thus the amplitude of the signal will increase to a maximum when the beam is directed toward the aircraft and will decrease to a minimum when the rotating beam is 180° displaced from the aircraft. The 100 cycle per second amplitude modulation is detected by the amplitude detector 75 and is applied to the phase detectors 81 and 102.

At the same time the main beam is frequency modulated which provides a reference with which to match or compare the phase of the amplitude modulation so as to determine where the aircraft is positioned in the beam.

The received signals are amplitude demodulated by the crystal rectifier 71 to recover the 100 kc. amplitude modulation signal, such signal being amplified by the preamplifier 72 and the post amplifier 73. The output of the post amplifier 73 is applied to an automatic gain control circuit 108, the output of which is applied via lead 110 to the pre-amplifier 72 and via lead 111 to the post amplifier 73.

In order to obtain a reference for locating the position of the aircraft in the beam, the frequency modulation component is extracted from the transmitted signal. It will be recalled that the frequency modulation component was developed with the phase of the 100 c.p.s. pulse generator, block 40 (FIG. 3) bearing a relation to the phase of rotation of the scanning of the antenna, each controlled by the common motor M and that this signal was reduced to a 50 c.p.s signal by the frequency divider 41.

The frequency modulation component is extracted by use of a frequency modulation discriminator, block 76, which accepts the output of the amplitude limiter, block 74. The 50 cycle frequency modulation component is applied to a frequency doubler circuit, block 77, so that the signal is returned to the exact characteristic as generated by the 100 c.p.s. pulse generator, block 40 (FIG. 3).

The phase relationship between the amplitude modulation component (the output of amplitude detector 75) and the frequency modulation component (the output of amplifier 78) is determined by phase detector circuits.

The output of the phase detector 81 is proportional to the horizontal displacement of the aircraft from the position of phase coincidence. This signal is applied to the horizontal movement of a cross-pointer indicator 95, represented by the coil 96 operating the horizontal indicator bale 97 through mechanical linkage 98.

In order to obtain a signal representative of the vertical displacement of the aircraft from the axis of rotation of the transmitted beam the reference signal (the output of amplifier 78) is applied to a phase shifter 101 which shifts the phase of the signal 90°. The phase shifted signal is applied to a phase detector 102. Also applied to phase detector 102 is the output of amplitude detector 75. The output of the phase detector circuit 102 is a signal which is proportional to the vertical displacement of the aircraft from the axis of the rotating beam. This signal is applied to the coil 103 for controlling the vertical bale 104 through linkage 105 coupled to the cross-pointer indicator 95.

Thus the pilot of an aircraft need only fly his craft so as to maintain the intersection of the cross-pointer indicator bales at the center or zero to maintain his craft on the axis of rotation of the transmitted beam and hence on the proper glide approach. This is referred to as boresighting the beam.

When an aircraft is in the main beam and is at a relatively large distance from the transmitter, say 10 nautical miles, for example, the area covered by rotation of the main beam may be approximately one nautical mile in diameter. At this distance, if a sudden wind shift should cause the aircraft to veer off course by, for example 50 feet, the signal amplitude change indicating this displacement and applied to the coils 96 and 103 would be relatively small and the inherent damping of the cross-pointer indicator movement is sufficient to overcome any overswing. However, when an aircraft is relatively close to the transmitter the area covered by the rotating transmitted beam is much smaller and the same 50-foot shift from course will produce a relatively large change in signal applied to the indicator coil 98 and 103, which may result in a large overswing of the pointer-indicators.

In order to overcome this difficulty the indicator movements may be damped. This may be accomplished by coupling an adjustable resistor in shunt with the coil and a capacitor in shunt with both the coil and the adjustable resistor. Any change in signal from the phase detector 81 will be applied to the coil 103, adjustable resistor 112 and capacitor 114. The effect of any large change will be dampened by action of the RC combination. Adjustable resistor 113 and capacitor 115 each in parallel with each other and coil 96 serves a similar purpose for the signal output of phase detector 102.

It will be appreciated that the output of phase detector 81 may be positive or negative, according to the horizontal position of the aircraft. In addition, the output of the diode 86 will be negative and the output of diode 87 will be positive. Thus the bale 97 may serve for indicating the direction an aircraft must fly to approach the boresight of the main beam.

In order to determine that the aircraft is in the main beam, as opposed to the auxiliary beams, the output of the post amplifier 73 is applied to a rectifier, (which is sensitive to the 100K c.p.s. component of the output of the post amplifier) block 119 and thence to a flag driver 93. Since there is no output from either the $n1$ c.p.s. filter 82, or the $n2$ c.p.s. filter 83, the inhibit line will be deenergized and therefore the flag driver 93 may excite the glide slope flag 94 thereby indicating that the aircraft is in the main beam. In addition, the auxiliary beam indicator flag will not be deflected since there is no driving signal applied to the flag driver 91. This provides a second indication that the main beam is being received.

In the above description the signal used for frequency modulation was divided by two in the transmitter and multiplied by two in the receiver. However, it will be appreciated that operation is not restricted to the use of such factor. However, if the signal is divided by another factor the same factor should be used for multiplication at the receiver.

The disclosed system, including the timing of the cycle of operation, frequency characteristics and rate of rotation and related frequency modulation has been described in its preferred form, which has been operated sucessfully. However, modifications and alternations of the system may be made, as will be familiar to those skilled in the art, without departing from the spirit of the invention as defined in the appended claims.

What is claimed is:
1. A tactical landing approach radio system comprising,
  a ground-based transmitter including antenna means for radiating a plurality of directive beams of radio signal energy including,
  a main beam,
  a first auxiliary beam and
  a second auxiliary beam,
  means for rotating said main beam of signal energy in a conical scan about an axis at a selected rate of rotation,
  means operated in synchronism with the rotation of said main beam for generating a reference signal having a frequency related to the rate of rotation of said main beam and a phase dependent on the positional displacement thereof,
  a local oscillator,
  cyclic timing means for providing a timed cycle including a first timed interval and a second timed interval,
  means for frequency modulating the output of said local oscillator by the said reference signal during said first timed interval,
  a microwave generator,
  means for amplitude modulating the output of said microwave generator by the frequency modulated output of said local oscillator for generating a modulated main beam transmission signal during said first timed interval,
  means for imposing said modulated main beam transmission signal on said antenna means for transmitting said main beam during said first timed interval,
  means for dividing said second timed interval into two timed periods,
  means for pulse amplitude modulating the output of said microwave generator by the output of said local oscillator at a first predetermined rate during the first timed period of said two timed periods for providing a first pulse modulated transmission signal,
  means for imposing said first pulse modulated transmission signal on said antenna means for transmitting said first auxiliary beam during said first timed period,
  means for pulse amplitude modulating the output of said microwave generator by the output of said local oscillator at a second predetermined rate during the second timed period of said two timed periods for providing a second pulse modulated transmission signal,
  means for imposing said second pulse modulated transmission signal on said antenna means for transmitting said second auxiliary beam during said second timed period,
  an airborne receiver including an amplitude modulation detector for deriving a signal from said main beam transmitted signal having a frequency related to the rate of rotation of said main beam of signal energy,
  a frequency modulation detector for producing an output signal having a frequency equal to the frequency modulation component of said main beam of signal energy,
  means for detecting the phase relation of the output of said amplitude modulation detector relative to the output of said frequency modulation detector,
  position indicator means energized by the output of said phase detector means,
  said receiver further including means for detecting said first pulsed modulated transmitted signal and for providing a first indication signal in response thereto, and
  means for detecting said second pulse modulated transmitted signal and for providing a second indication signal in response thereto.

2. A tactical landing approach radio system as in claim 1 and in which said position indicator means includes,
  indicator means commonly responsive to the output of said phase detector means, said first indication signal and said second indication signal for indicating reception of radio energy transmitted by said ground based transmitter and the direction to the center of said main beam.

3. A tactical landing approach radio system as in claim 1 and in which said position indicator means includes,
  indicator means commonly responsive to the output of said phase detector means, said first indication signal and said second indication signal for indicating reception of radio energy transmitted by said ground based transmitter, and said receiver further includes
  means commonly responsive to said first indication signal, and to said second indication signal for indicating that an auxiliary beam is being received.

4. A tactical landing approach radio system as in claim 1 and in which said receiver further includes,
  means responsive to the local oscillator output component of the received signal for indicating said main beam is being received.

5. A tactical landing approach radio system as in claim 1 and in which said antenna means includes,
  means for transmitting said first auxiliary beam directionally to a position horizontally adjacent to one side of the said main beam, and means for transmitting said second auxiliary beam directionally to a position horizontally adjacent to the other side of the said main beam.

6. A tactical landing approach radio system as in claim 1 and in which said position indicator means includes, indicator means commonly responsive to the output of said phase detector means, said first indication signal and said second indication signal for indicating reception of radio energy transmitted by said ground based transmitter, and said receiver further includes, means commonly responsive to said first indication signal and to said second indication signal for indicating that an auxiliary beam is being received, and means responsive to the local oscillator output component of the received signal for indicating said main beam is being received.

7. A tactical landing approach radio system as in claim 6 and in which said receiver further includes, means responsive to said first indication signal and said second indication signal respectively for inhibiting response by said main beam indicating means to the local oscillator output component of the received signal.

References Cited by the Examiner
UNITED STATES PATENTS

| | | | |
|---|---|---|---|
| 2,728,076 | 12/1955 | Granqvist | 343—106 |
| 2,730,715 | 1/1956 | Guanella et al. | 343—106 |
| 2,954,555 | 9/1960 | Guttinger et al. | 343—108 |
| 3,197,777 | 7/1965 | McKay | 343—108 |

CHESTER L. JUSTUS, *Primary Examiner.*

H. C. WAMSLEY, *Assistant Examiner.*